(12) United States Patent
Xie et al.

(10) Patent No.: US 10,713,692 B2
(45) Date of Patent: Jul. 14, 2020

(54) SYSTEMS AND METHODS FOR USER PROPENSITY CLASSIFICATION AND ONLINE AUCTION DESIGN

(71) Applicant: Yahoo Holdings, Inc., Sunnyvale, CA (US)

(72) Inventors: Zhihui Xie, Sunnyvale, CA (US); Kuang-chih Lee, Fremont, CA (US); Junwei Pan, Sunnyvale, CA (US)

(73) Assignee: Oath Inc., New York, NY (US)

( * ) Notice: Subject to any disclaimer, the term of this patent is extended or adjusted under 35 U.S.C. 154(b) by 293 days.

(21) Appl. No.: 15/783,540

(22) Filed: Oct. 13, 2017

(65) Prior Publication Data

US 2019/0114677 A1    Apr. 18, 2019

(51) Int. Cl.
*G06Q 30/02* (2012.01)
*G06N 5/04* (2006.01)

(52) U.S. Cl.
CPC ......... *G06Q 30/0275* (2013.01); *G06N 5/046* (2013.01); *G06Q 30/0247* (2013.01)

(58) Field of Classification Search
CPC . G06Q 30/0275; G06Q 30/0247; G06N 5/046
See application file for complete search history.

(56) References Cited

U.S. PATENT DOCUMENTS

| 9,684,826 | B2* | 6/2017 | Dubuque | G06K 9/00536 |
| 2008/0147488 | A1* | 6/2008 | Tunick | G06Q 30/02 705/7.29 |
| 2009/0171766 | A1* | 7/2009 | Schiff | G06Q 30/02 705/14.43 |
| 2010/0317420 | A1* | 12/2010 | Hoffberg | G06Q 30/0207 463/1 |
| 2014/0006172 | A1* | 1/2014 | Pardoe | G06Q 30/08 705/14.71 |
| 2014/0058849 | A1* | 2/2014 | Saifee | G06Q 30/0275 705/14.71 |
| 2014/0079297 | A1* | 3/2014 | Tadayon | G06K 9/00 382/118 |
| 2015/0356631 | A1* | 12/2015 | Vempati | G06Q 30/02 705/14.71 |
| 2016/0275570 | A1* | 9/2016 | Seljan | G06Q 30/0275 |

* cited by examiner

*Primary Examiner* — Colleen A Hoar
(74) *Attorney, Agent, or Firm* — Cooper Legal Group, LLC (57) ABSTRACT

Systems, devices, and methods are disclosed for predicting a dynamic floor price for increasing cleared revenue cleared after a winning bid is determined in an online bid auction. The dynamic floor price is predicted from a cascading classifier strategy implemented through a series of cascading machine learning based classifier models that have been trained.

20 Claims, 5 Drawing Sheets

|   | Highest Bid | Second Highest Bid | Floor | Clearing (Revenue) |
|---|---|---|---|---|
| 1 | $10 | $5 | $3 | $5 |
| 2 | $10 | $5 | $8 | $8 |
| 3 | $10 | $5 | $11 | $0 |

Figure 5

SYSTEMS AND METHODS FOR USER PROPENSITY CLASSIFICATION AND ONLINE AUCTION DESIGN

BACKGROUND

An effective online advertisement campaign strives to present online users with relevant advertisements to maximize a probability that the online user will take a conversation action on the presented advertisement. A conversion action may include clicking on the advertisement, viewing a webpage associated with the advertisement, purchasing an offer included in the advertisement, or other measurable online activity. Each user visit to a webpage offers the webpage publisher an opportunity to run an online advertisement bid auction, where advertisers bid on the opportunity to impress their advertisements on the webpage.

More so than paper advertisements, such internet-based advertising provides advertisers with the tools and information for creating more cost effective advertisement campaigns that better target relevant online consumers. In view of the popularity of targeted online advertisement, online advertisement auction holders continue to look for new strategies to increase the accuracy of predicting targeted users that will have a higher likelihood of converting on a presented advertisement. By improving their prediction models and increasing their conversion rates, webpage publishers are able to attract more advertisers to submit bids to advertise on their platforms, as well as see the bid values increase.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increasing popularity of consumers viewing web-based content for entertainment, research, obtaining news, shopping, or other activities involving the exchange of information, advertisers and webpage publishers have taken notice. Accordingly, new internet-based advertisement network systems are created that take advantage of internet technology and online advertisement strategies not previously available or utilized. In particular, this disclosure describes a cascading classification strategy that provides an improvement in the way an auction server implementing an online bid auction according to the cascading classification strategy is able to more quickly, efficiently, and accurately predict a dynamic floor price to apply in the online bid auction.

Within the advertisement network system, an advertiser is understood to generate and otherwise provide an internet advertisement that offers, for example, goods or services for sale. Each advertiser may operate an advertiser server that generates and/or stores various advertisements and their respective advertisement campaign strategies.

A publisher is understood to host a webpage for presenting online multimedia content, as well as advertisements received from advertisers. The publisher may operate a publisher web server to hosts a webpage to present the online multimedia content (e.g., digital articles, images, videos, audio files, and/or other multimedia content) to users visiting the web page, as well as present the advertisements. The publisher may also operate an auction server to conduct an online bid auction for selecting the advertisements that will be presented on the webpage. To get their advertisements presented on webpages, the advertiser servers submit their bids to the auction server running the online bid auction, and the advertiser with the highest bid will "win" the online bid auction and have their advertisement presented on the webpage, or webpages, hosted by the publisher. When the online bid auction is a second price auction, instead of paying their winning bid amount (i.e., the highest bid amount), the winning advertiser will pay the amount bid by the second highest bidder.

Figure 5:
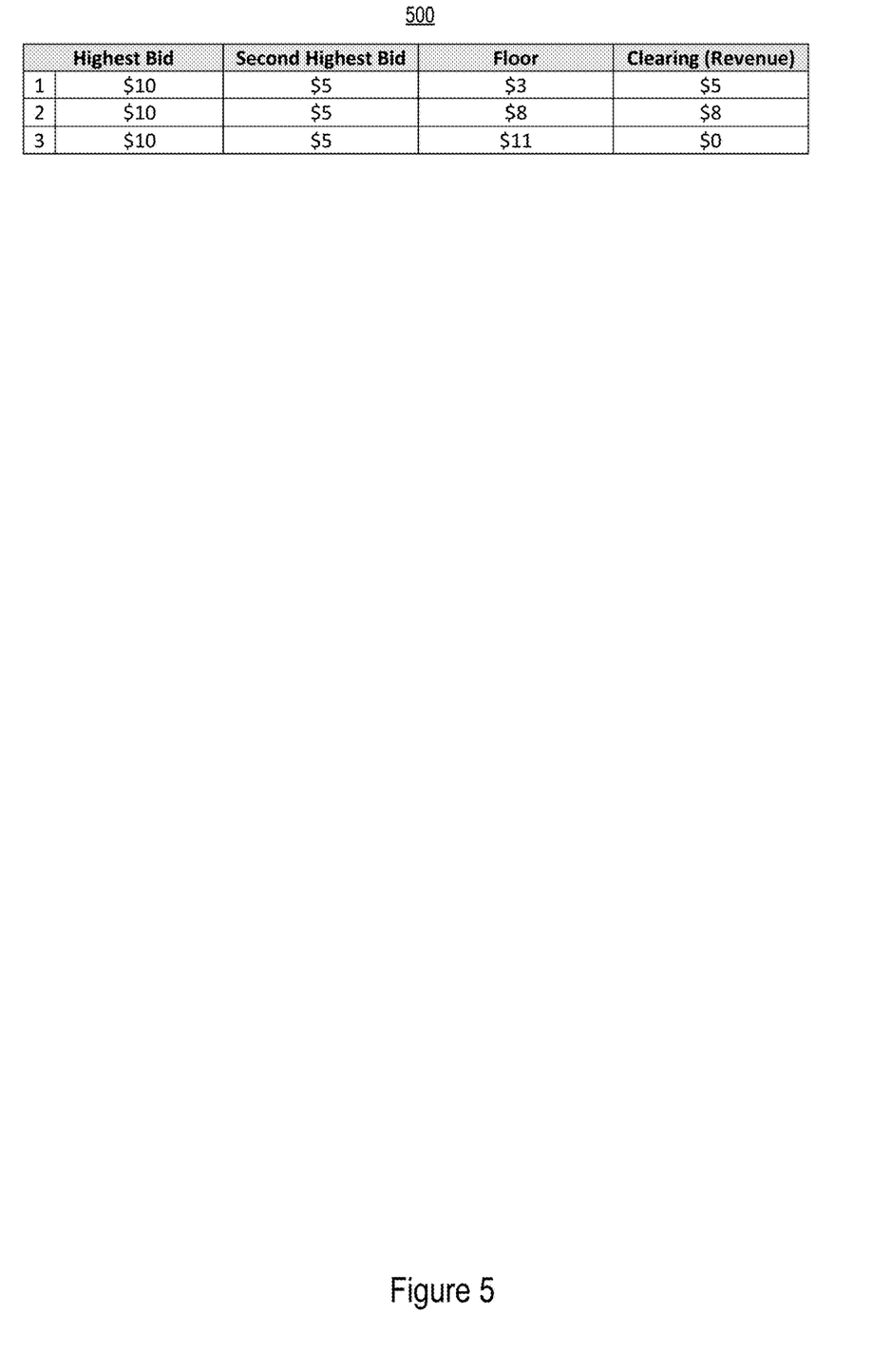
FIG. 5 illustrates a bid table showing different exemplary floor prices for a second price auction.

To improve upon the second price auction, the present disclosure describes the cascading classification strategy for predicting a floor price that will be applied to the winning bid in the second price auction. When implementing the floor price, the winning advertiser will pay the greater of the second highest bid price and the floor price. However, when the winning bid amount does not clear the floor price, the online bid auction is considered to have failed and none of the advertisers will have their advertisements presented for the current round of bidding. FIG. 5 illustrates a bid table 500 for three different second price online bid auction scenarios with the same winning highest bid and second highest bid values, but with different floor values applied to each of the scenarios. In the first scenario, the floor value is set to $3 and the publisher will clear $5 which is the higher of the second highest bid value and the set floor value. In the second scenario, the floor value is set to $8 and the publisher will clear $8 which is the higher of the second highest bid value and the set floor value. In the third scenario, the floor value is set to $11 and the publisher will clear $0 because the floor has been set too high such that the winning highest bid does not meet or exceed the floor value. The different scenarios described by the bid table 500 demonstrate the importance in predicting and setting the floor value to maximize the cleared revenue for the publisher. Ideally, the floor value predicted from the cascading classification strategy will be as close to the highest bid value without going over the highest bid value (e.g., ideal floor value is equal to the winning highest bid value).

Therefore, systems, devices, and methods are disclosed for implementing the cascading classification strategy that will predict the best floor value for maximizing the publisher's revenue. The systems, devices, and methods utilize internet based technology, and in particular machine learning techniques available through, for example, a neural network, to implement the cascading classification strategy. As will be described, each node in the cascading classification strategy corresponds to a machine learning model that has been trained from historical information to output improved predictions for the floor value that will be applied to the online bid auction to maximize revenues.

Figure 1:
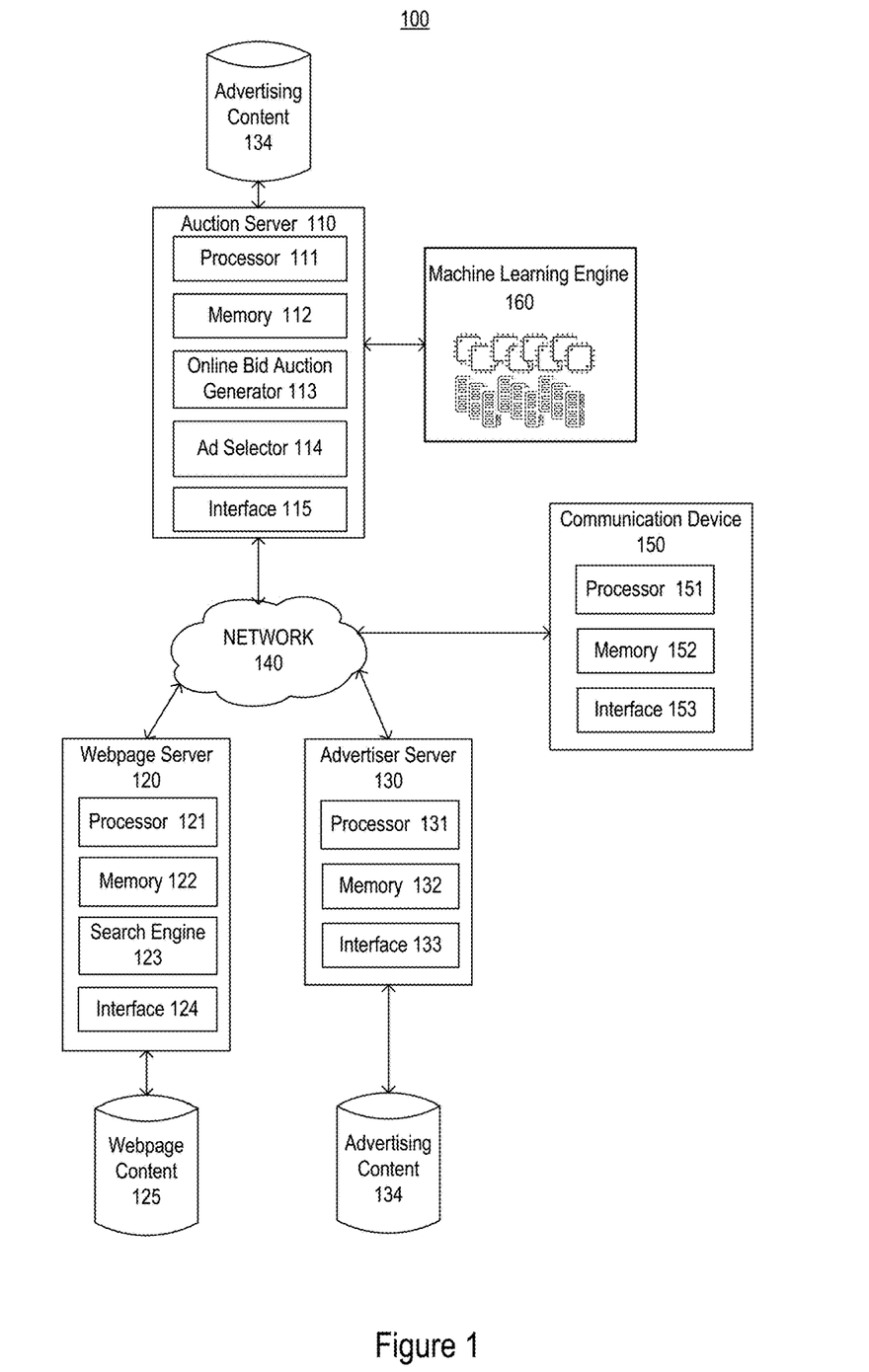
FIG. 1 illustrates a system diagram of an exemplary advertisement network system.

FIG. 1 illustrates an exemplary system diagram of a network system 100 for implementing the cascading classification strategy based on, at least, gathered internet-centric information and machine learning techniques. The network system includes various component devices communicating information via a network 140. The network 140 may include a wireless network configured to couple a communication device 150 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, the network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within the network 140, or the like.

Signal packets communicated via the network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of the network 140, such as, for example, to one or more sites employing a local network address. A signal packet may, for example, be communicated over the Internet from a user site via an access node coupled to the Internet. Likewise, a signal packet may be forwarded via network nodes to a target site coupled to the network 140 via a network access node, for example. A signal packet communicated via the Internet may, for example, be routed via a path of gateways, servers, etc. that may route the signal packet in accordance with a target address and availability of a network path to the target address.

The network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

With respect to the network 140, the network 140 may couple devices so that communications may be exchanged, such as between a webpage server 120 and communication device 150, or other devices within the network system 100, including between wireless devices coupled via a wireless network, for example. The network 140 may also include mass storage, such as network attached storage (NAS), a storage area network (SAN), or other forms of computer or machine readable media, for example. The network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger the network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to the network 140, such as via a telephone line or link, for example.

The network system 100 is shown to include an advertiser server 130 comprised of a processor 131, a memory 132, and a network interface 133 for accessing network 140. The advertiser server 130 may generate an advertiser's internet advertisement, where the internet advertisement includes a link (e.g., a hyperlink) to the advertiser's web page that is activated when a user clicks on the internet advertisement. The internet advertisements may be stored on an advertising content database 134 that is in communication with the advertiser server 130. The advertiser server 130 may further control the network interface 133 to transmit internet advertisements to other devices within the network system 100 via the network 140.

The network system 100 also includes a webpage server 120 that hosts one or more webpages corresponding to a publisher. For instance, the webpages may belong to a group of owned and operated (OO) webpages operated by a common publisher. The webpage server 120 may be comprised of a processor 121, a memory 122, a search engine 123, and a network interface 124 for accessing network 140. Webpage content presented on webpages hosted by the webpage server 120 may be stored on a webpage content database 125 in communication with the webpage server 120. The search engine 123 may receive a user's search query and search for related webpage content stored in the webpage content database 125. The webpage server 120 may select, from the webpage content database 125, webpage content for presented on a webpage hosted by the publisher based on the search results determined by the search engine 123. The webpage server 120 may also receive internet advertisements from auction server 110 to include in a rendering of a hosted web page.

The network system 100 also includes a communication device 150 that may be comprised of a processor 151, a memory 152, and a network interface 153 for accessing network 140. The communication device 150 may be for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. Further, the communication device 150 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples.

The communication device 150 may also include or execute an application to communicate content, such as, for example, textual content, multimedia content, or the like. The communication device 150 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities. For example, communication device 150 may run a web browser application for accessing a webpage hosted by webpage server 120, and rendering webpage content presented on the hosted webpage within the web browser application running on the communication device 150.

The network system 100 also includes the auction server 110, which may in turn include: a processor 111, a memory 112, an online bid auction generator 113, an ad selector 114, and a network interface 115 for accessing the network 140. The auction server 110 communicates with webpage server 120 to detect when a user visits a webpage hosted by the webpage server 120, a user inputs a search inquiry into a search engine of a webpage hosted by the webpage server 120, or other activity on the webpage that may be interpreted as a new online bid auction opportunity. In this way, the auction server 110 may be considered to be operated in association with the publisher corresponding with the webpage server 120. Upon realizing a new online bid auction opportunity from the detected activity the webpage, the auction server 110 initiates a new online bid auction.

During the online bid auction, the auction server 110 receives bids from one or more advertisers through their advertiser servers, such as the advertiser server 130 shown in FIG. 1. Each bid received by the auction server 110 is considered until a winning highest bid is determined. During the online bid auction, the auction server 110 is also implementing the cascading classification strategy to determine a dynamic floor value for the current online bid auction. For second price auctions, the winning advertiser will be responsible for paying the higher of the second highest bid and the determined dynamic floor price, as long as the winning highest bid is greater than the determined dynamic floor value. The winning advertiser is then selected to present their advertisement content on the webpage.

The online bid auction generator 113 may input sample data relating to each of the bids into the cascading classification strategy, where the sample data includes dimensional information received from webpage server 120 and/or communication device 150. The dimensional information may include, for example, search query information (e.g. a user's search query input to search engine 123), communication device information (e.g., information identifying a device type of communication device 150), and/or publisher identification information (e.g., information identifying webpage server 120 as being associated with a particular publisher). The dimensional information may also include historical online information that identifies the historical quality (e.g., conversion rate) for previous user traffic received based on a similar or same search query, a similar or same communication device accessing the webpage, a similar or same publisher webpage, or some combination thereof that may have an influence on conversation rates. The dimensional information may also include inventory characteristic information describing the advertisement opportunity being auctions (e.g., advertisement position on the webpage, size of advertisement space on webpage, webpage attributes). The dimensional information may also include user characteristics related to the user initiating the webpage activity for the current online bid auction opportunity (e.g., user age, user gender, user age, user's communication device attributes, web browser attributes, user's online browsing history, user conversion history). The dimensional information may also include advertiser side characteristics such as whether the bidding advertiser belongs to a particular group of advertisement buyers (e.g., demand side platform (DSP) group identification), or a winning demand seat (lagged per user) information. The dimensional information may also include other auction data such as the date, time, time of day, or day of the week of the online bid auction.

According to some embodiments, the auction server 110 may be included with the webpage server 120, while in other embodiments the auction server 110 may be a separate computing device as illustrated in FIG. 1. The auction server 110 may also be in communication with the advertising content database 134 that stores internet advertisements. The internet advertisements stored on advertising content database 134 may have been received from advertiser server 130 through network interface 115 via the network 140.

The network system 100 also includes a machine learning engine 160, where the machine learning engine 160 may be hosted across a neural network of server computers. The machine learning engine 160 is configured to apply known machine learning models for each node that comprises the cascading classification strategy for predicting the dynamic floor price value. A more detailed description of the cascading classification strategy is provided with respect to FIG. 3.

Figure 2:
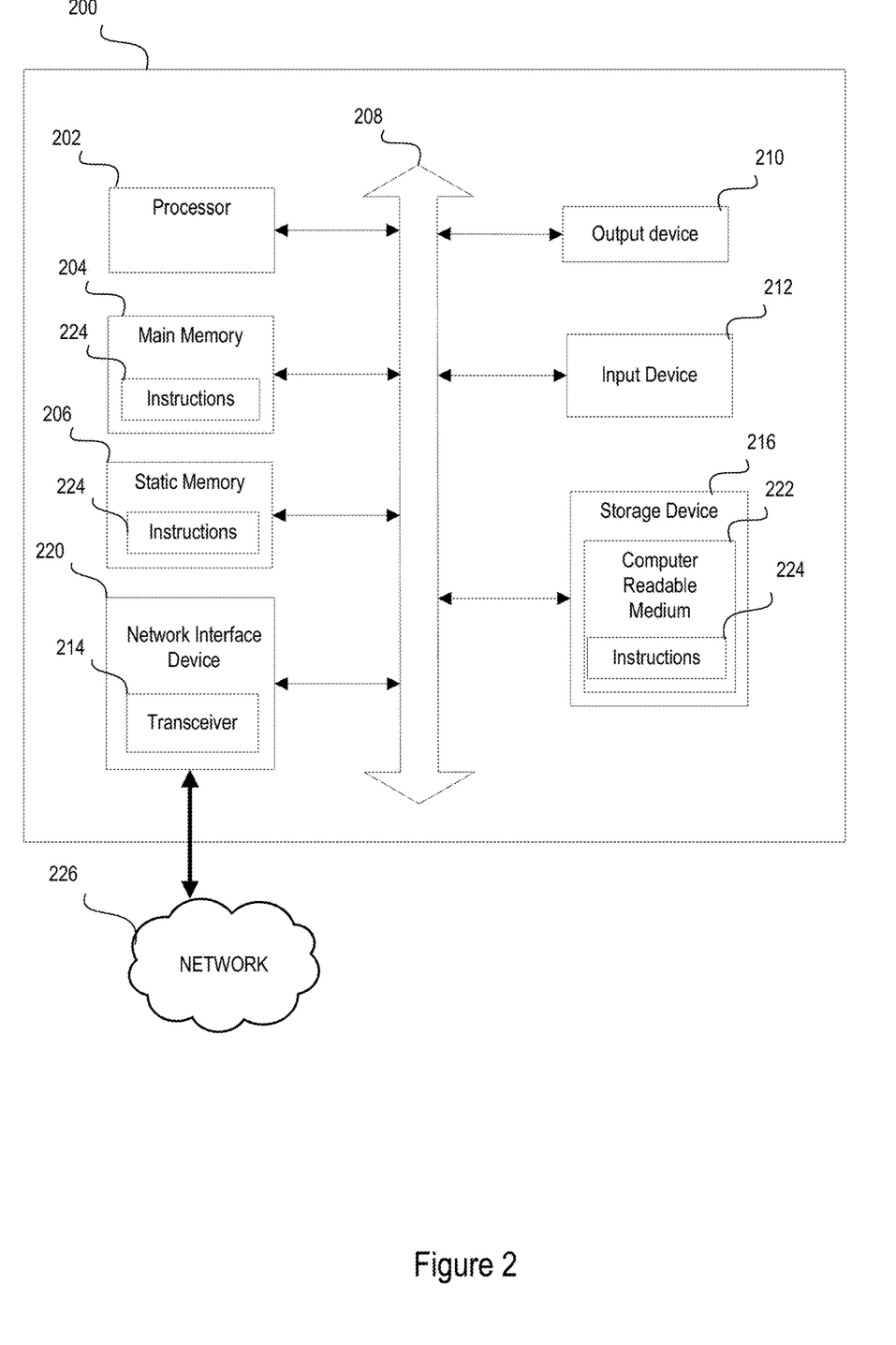
FIG. 2 illustrates a block diagram of an exemplary computer architecture for one or more devices included in the system illustrated in FIG. 1.

FIG. 2 illustrates exemplary computer architecture for a computer 200. Embodiments of the computer 200, including embodiments that include additional components and embodiments including fewer components than described, may be representative of any one or more of the devices that comprise network system 100 illustrated in FIG. 1.

The computer 200 includes a network interface device 220 that enables communication with other computers via a network 226, where network 226 may be represented by the network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although other appropriate processors may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 and/or operation of the process steps and other features described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that represent the online bid auction generator 113 described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data, which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with the network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

The computer 200 may be implemented using any suitable hardware and/or software, such as a personal computer or other electronic computing device. In addition to the various types of wearable devices described herein, the computer 200 may also be a portable computer, laptop, tablet or notebook computer, PDA, pocket computer, appliance, telephone, or mainframe computer.

Figure 3:
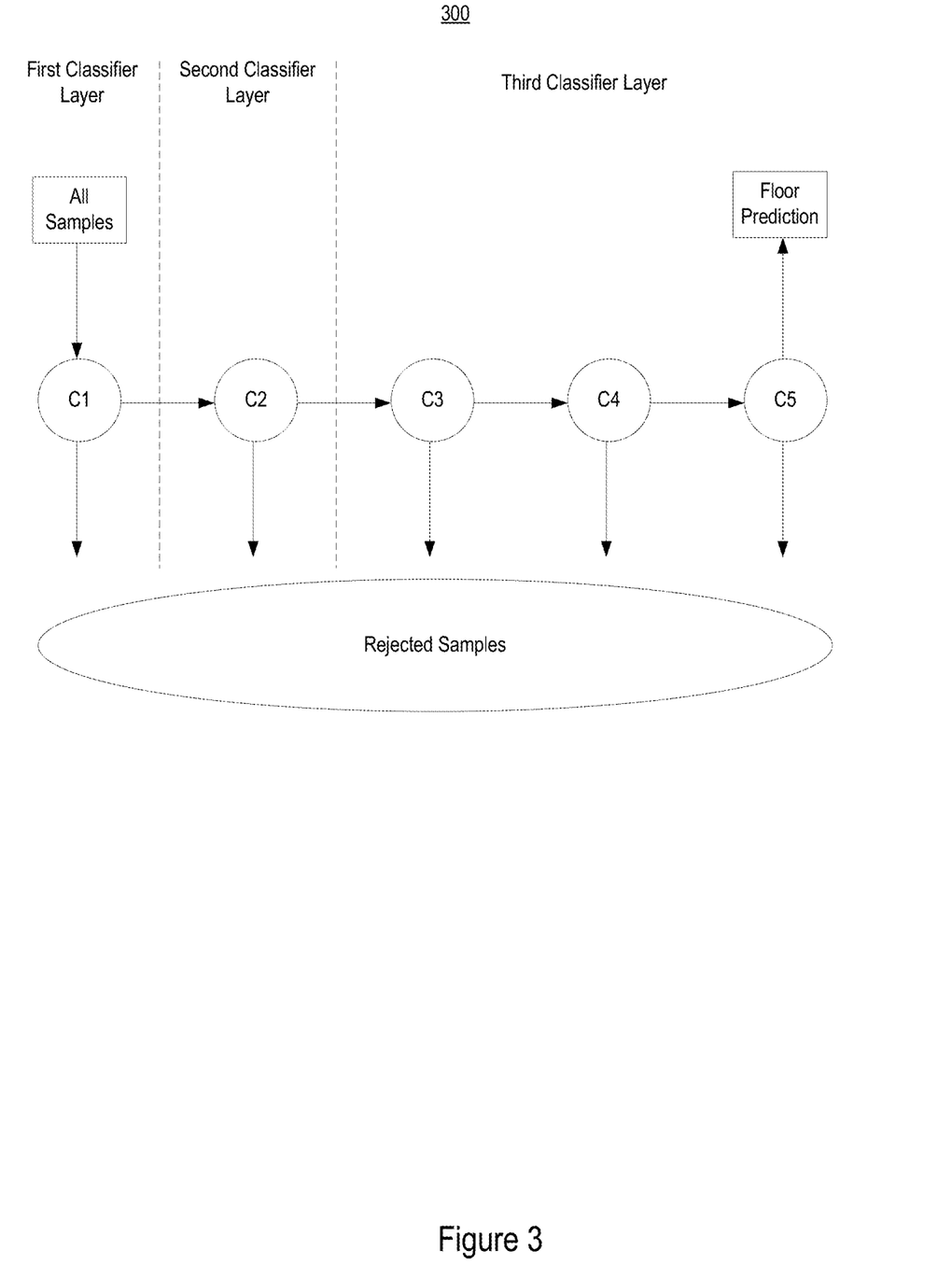
FIG. 3 illustrates a cascading node tree depicting an exemplary cascading classification strategy.

FIG. 3 illustrates a cascading node tree 300 depicting an exemplary cascading classification strategy. The cascading node tree 300 includes a first classification layer, a second classification layer, and a third classification layer. The first classification layer includes a first node C1 representing a first machine learning model that serves as a filter classifier analyzing sample data to determine whether the bid relating to the sample data is associated with an advertisement identified as being a high value opportunity. For example, the bid values, and subsequent clearing revenue potential, for certain advertisement opportunities will be greater than others. Sample data is input to the first machine learning model, where the first machine learning model operates to identify those samples relating to bids potentially clearing revenue greater than a threshold value. The sample data identified by the first machine learning model as potentially clearing revenue greater than the threshold value are filtered from those that do not, and are considered to be positive samples that are pushed on to the second classifier layer. The sample data related to bids identified as not potentially clearing revenue greater than the threshold value are considered negative samples and discarded as rejected samples, and are no longer included for further processing.

The second classification layer includes a second node C2 representing a second machine learning model that operates as a separation classifier measuring a difference between a first bid price (e.g., winning highest bid price) and a second bid price (e.g., second highest bid price) in a second price online bid auction. Sample data having passed through the first classification is input to the second machine learning model, where the separation classifier operates by allowing samples relating to bids satisfying a predetermined difference between the bid and the winning highest bid price to move on to the third classifier layer. Those samples related to bids that do not satisfy the predetermined different are discarded as rejected samples, and are no longer included for further processing.

The third classification layer is a set of prediction classifiers shown to include three distinct nodes; however more or less nodes may be included. The third classification layer includes a third node C3 representing a third machine learning model, a fourth node C4 representing a fourth machine learning model, and a fifth node C5 representing a fifth machine learning model. Each of the machine learning models that are included in the third classifier layer may be their own distinct prediction classifier for filtering out sample data that does not satisfy specific classification criteria of the classifier. Sample data satisfying the classification criteria of a classifier are considered to be positive samples that are input to the next classifier, while sample data failing to satisfy the classification criteria of a classifier are considered to be negative samples that will no longer be included for processing at the subsequent classifier.

The classifiers may be arranged such that initial machine learning model classifiers (e.g., C3) are simpler than subsequent machine learning model classifiers (e.g., C4 and C5), where each subsequent classifier includes a more narrow set of classification criteria. By arranging the classifiers in this cascading order from simple to more complex, the cascading classification strategy is able to eliminate a large number of negative samples in a short time. Each node may also be considered its own stage within the cascading classification strategy.

In the cascading classification strategy, a strong classifier is built in each stage using a boosting method. A set of single features is picked and the classifiers $h_j$ are trained (weak learners) with the specific feature, and then the weak learners are combined using the AdaBoost algorithm which essentially selects a set of good learners. The AdaBoost algorithm iteratively assigns appropriate weights on each training example.

The basic steps of this AdaBoost algorithm are as follows. There are T loops and at stage t, weight $D_t(.)$ is assigned to the training example i. The goal of the learning algorithm is to produce a hypothesis $h_t(.)$ such that the error at the current stage is minimized.

$$\epsilon_t = \sum_{i=1}^{n} D_t(i) I(h_t(x_i) \neq y_i)$$

Where I is the indicator function and is equal to 1 if the argument in the bracket is true, and is 0 otherwise. $\epsilon_t$ is the probability of error of classifier $h_t(.)$, with respect to the distribution of weights $D_t(.)$. Since the sum of the weights is 1, the error is always in the range [0,1].

Upon finishing all the iterations, the classification rules $h_t$, t=1, 2, . . . T are combined to form a strong classifier, $$H(x) = \text{sign}\left(\sum_{i=1}^{T} (\alpha_t h_t(x))\right)$$

where sign (v) is the sign function and 1 is returned if v>0, and −1 is returned if v<0. The coefficients $\alpha_t$ are generated according to the errors, $$\alpha_t = \frac{1}{2} \ln\left(\frac{1-\epsilon_t}{\epsilon_t}\right)$$

The idea of the cascading is to reduce the false positive rate of a prediction algorithm by combining a series of classifiers. In order for a sample to be predicted as positive, all the classifiers in the cascading must predict it to be positive, otherwise it will be predicted as a negative sample.

In the training process, a positive result from a current classifier triggers the evaluation of the next classifier that has also been adjusted to achieve high detection rate. A positive result from the next classifier triggers a third classifier and so on. A negative outcome from any point leads to a termination of the chain and is labelled as negative immediately. Subsequent classifiers are trained using the examples that pass through all the previous stages.

The training process of a single classifier aims to minimize errors rather than achieve high detection rates at the expense of large false positive rates. A straightforward tradeoff is to adjust the threshold of the decision rule produced by AdaBoost. In general, lower threshold yields a classifier with more false positives and higher detection rate and a higher threshold yields classifier with few false positives and a lower detection rate. The classifiers with more features achieve better detection rate and consumes more time to process.

The final algorithm, then, combines factors such as, but not limited to, a number of stages, a number of features for each stage and the threshold for each stage together and optimizes the running time while achieving the detection rate and false positive rate goal. In an implementation, the bounds for maximum accepted false positive rate and minimum accepted detection rate (or true positive rate) are manually set up. AdaBoost trains each layer of cascade with increasing number of features until the detection and false positive rates are met for that stage. Then both the rates are confirmed by testing on a validation data set.

The overall false positive rate is also evaluated after the training and testing one level are completed, if the bound is not yet met and then another layer is added to the cascade. The false detections on the true negative set are placed into the training set of subsequent classifiers.

Thus, the methods, devices, and systems disclosed herein provide an effective technique for improving both publisher and exchange revenue by focusing on certain high valued auctions based on cascading of dedicated classifiers and also provides significant revenue improvement for DSP systems. Further, the model utilized by the method and system is data-driven and non-parametric and is highly versatile to data pattern changes and can be easily updated periodically with the system.

Figure 4:
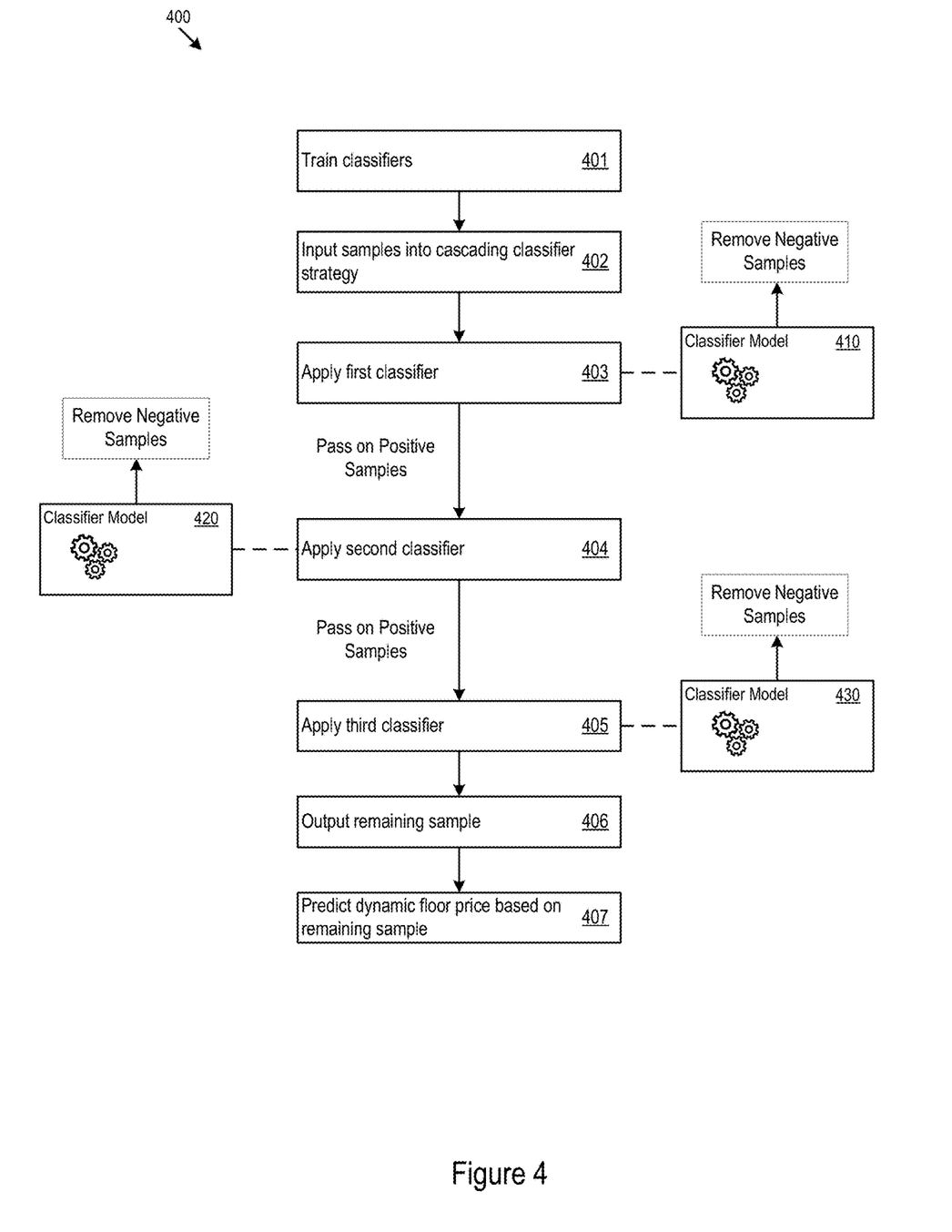
FIG. 4 illustrates a flow diagram of logic describing an exemplary cascading classifying strategy for predicting a dynamic floor price.

FIG. 4 is a flow diagram 400 of logic describing an exemplary cascading classifying strategy for predicting a dynamic floor price. The cascading classifying strategy described by the flow diagram 400 may be implemented by, for example, the auction server 110 running the online bid auction shown in FIG. 1.

Prior to beginning an online bid auction, classifiers that are utilized by the cascading classifying strategy are trained (401). For example, the training of the classifiers may be implemented by their respective machine learning model according to the training processes described herein.

After training the classifiers, samples are input to the cascading classifier strategy (402). For example, the samples may be comprised of sample data that includes the dimensional information described herein. Each sample may be associated with a bid received by the auction server 110 from an advertiser. Each bid is allocated to a bucket, where each bucket represents a range of floor prices (e.g., floor prices may be allocated to buckets ranging in five cent intervals, or other measurable price interval).

A first classifier is applied to the samples (403). For example, a machine learning classifier model 410 may implement the specific criteria of the first classifier. Samples that do not satisfy the first classifier criteria are considered to be negative samples and are removed from further consideration. Those samples that do satisfy the first classifier criteria are considered positive samples and passed on to the next classifier.

A second classifier is applied to the positive samples from the first classifier (404). For example, a machine learning classifier model 420 may implement the specific criteria of the second classifier. Samples that do not satisfy the second classifier criteria are considered to be negative samples and are removed from further consideration. Those samples that do satisfy the second classifier criteria are considered positive samples and passed on to the next classifier.

A third classifier is applied to the positive samples from the second classifier (405). For example, a machine learning classifier model 430 may implement the specific criteria of the third classifier. Samples that do not satisfy the third classifier criteria are considered to be negative samples and are removed from further consideration. Those samples that do satisfy the third classifier criteria are considered positive samples and output as the resulting sample (406).

As described, each sample is associated with a bid received by the auction server 110 while running the online bid auction. The remaining sample after the cascading classifier strategy is associated with its own respective bid, and the respective bid is allocated to a specific bucket describing a range of floor prices. Therefore, the predicted dynamic floor price is selected to be a floor price from within the range of floor prices of the bucket the respective bid is allocated to (407). The predicted dynamic floor price is then applied to the current online bid auction, which in some cases will increase the cleared revenue for the publisher when a winning bid is decided.

The disclosed method and system may be implemented partly in a server, a client device, a cloud computing environment, partially in a server and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this disclosure.

What is claimed is:

1. A server computing device, comprising:
a network interface configured to:
receive a detection message from a publisher server, the detection message including user activity information on a webpage operated by the publisher server;
receive a bid request from an advertiser server; and
receive dimensional information; and
a processor in communication with the network interface, the processor configured to:
generate a sample based on at least one of the detection message, the bid request, or the dimensional information;
run the sample through a set of cascading classifier models, wherein the running the sample through the set of cascading classifier models comprises:
inputting the sample to a first classifier model of the set of cascading classifier models;
determining whether the sample is associated with a value exceeding a predetermined revenue threshold of the first classifier model; and
responsive to determining that the sample is associated with a value exceeding the predetermined revenue threshold, inputting the sample to a second classifier model of the set of cascading classifier models;
predict a floor price value based on the sample running through the set of cascading classifier models; and
implement an online bid auction based on the floor price value.

2. The server computing device of claim 1, wherein each subsequent classifier model in the set of cascading classifier models is more restricting than a prior.

3. The server computing device of claim 1, wherein each classifier model in the set of cascading classifier models is trained by machine learning according to an Adaboost technique.

4. The server computing device of claim 1, wherein the processor is configured to:

implement a second price online bid auction that incorporates the floor price value; and select the bid request as a winning bid of the second price online bid auction when the bid request has a value greater than other received bid request values and greater than the floor price value.

5. The server computing device of claim 1, wherein the bid request is allocated to a price range bucket from a plurality of price range buckets, wherein the price range bucket represents a range of floor price values.

6. The server computing device of claim 1, wherein the implementing the online bid auction comprises:

applying the floor price value to a winning bid in the online bid auction.

7. The server computing device of claim 1, wherein the processor is configured to:

determine whether a spread between a first received bid and a second received bid is greater than a predetermined bid spread; and when the spread between the first received bid and the second received bid is less than the predetermined bid spread, withhold running the sample through the set of cascading classifier models.

8. The server computing device of claim 1, wherein the dimensional information comprises at least one of a search query information, a communication device information, a publisher information, a historical online activity information, or a user attribute information.

9. A method for predicting a floor price, comprising:

receiving, by a processor, a detection message sent from a publisher server, the detection message including user activity information on a webpage operated by the publisher server;

receiving, by the processor, a bid request sent from an advertiser server;

receiving, by the processor, dimensional information;

generating, by the processor, a sample based on at least one of the detection message, the bid request, or the dimensional information;

running, by the processor, the sample through a set of cascading classifier models, wherein the running the sample through the set of cascading classifier models comprises:

inputting the sample to a first classifier model of the set of cascading classifier models;

determining whether the sample is associated with a value exceeding a predetermined revenue threshold of the first classifier model; and responsive to determining that the sample is associated with a value exceeding the predetermined revenue threshold, inputting the sample to a second classifier model of the set of cascading classifier models;

predicting, by the processor, a floor price value based on the sample running through the set of cascading classifier models; and implementing an online bid auction based on the floor price value.

10. The method of claim 9, wherein each subsequent classifier model in the set of cascading classifier models is more restricting than a prior.

11. The method of claim 9, wherein each classifier model in the set of cascading classifier models is trained by machine learning according to an Adaboost technique.

12. The method of claim 9, comprising:

implementing, by the processor, a second price online bid auction that incorporates the floor price value; and selecting, by the processor, the bid request as a winning bid of the second price online bid auction when the bid request has a value greater than other received bid request values and greater than the floor price value.

13. The method of claim 9, wherein the bid request is allocated to a price range bucket from a plurality of price range buckets, wherein the price range bucket represents a range of floor price values.

14. The method of claim 9, wherein the implementing the online bid auction comprises:

applying the floor price value to a winning bid in the online bid auction.

15. The method of claim 9, comprising:

determining, by the processor, whether a spread between a first received bid and a second received bid is greater than a predetermined bid spread; and when the spread between the first received bid and the second received bid is less than the predetermined bid spread, withholding, by the processor, running the sample through the set of cascading classifier models.

16. A non-transitory computer readable medium storing a set of processor executable instructions that, when executed by a processor, cause the processor to:

receive a detection message sent from a publisher server, the detection message including user activity information on a webpage operated by the publisher server;

receive a bid request sent from an advertiser server;

receive dimensional information;

generate a sample based on at least one of the detection message, the bid request, or the dimensional information;

run the sample through a set of cascading classifier models, wherein the running the sample through the set of cascading classifier models comprises:

inputting the sample to a first classifier model of the set of cascading classifier models;

determining whether the sample is associated with a value exceeding a threshold of the first classifier model; and responsive to determining that the sample is associated with a value exceeding the threshold, inputting the sample to a second classifier model of the set of cascading classifier models;

predict a floor price value based on the sample running through the set of cascading classifier models; and implement an online bid auction based on the floor price value.

17. The non-transitory computer readable medium of claim 16, storing instructions that, when executed by the processor, cause the processor to:

implement a second price online bid auction that incorporates the floor price value; and select the bid request as a winning bid of the second price online bid auction when the bid request has a value greater than other received bid request values and greater than the floor price value.

18. The non-transitory computer readable medium of claim 16, wherein the implementing the online bid auction comprises:

applying the floor price value to a winning bid in the online bid auction.

19. The non-transitory computer readable medium of claim 16, storing instructions that, when executed by the processor, cause the processor to:

determine whether a spread between a first received bid and a second received bid is greater than a predetermined bid spread; and when the spread between the first received bid and the second received bid is less than the predetermined bid spread, withhold running the sample through the set of cascading classifier models.

20. The non-transitory computer readable medium of claim 16, wherein each subsequent classifier model in the set of cascading classifier models is more restricting than a prior.

\* \* \* \* \*